United States Patent [19]

Fair

[11] 4,164,264
[45] Aug. 14, 1979

[54] HIGH PRESSURE SEALING APPARATUS

[75] Inventor: Delbert W. Fair, Ponca City, Okla.

[73] Assignee: Continental Oil Company, Ponca City, Okla.

[21] Appl. No.: 848,164

[22] Filed: Nov. 3, 1977

[51] Int. Cl.² .......................... G01V 1/04; F01B 15/00
[52] U.S. Cl. .................................. 181/119; 91/216 B; 92/111; 277/53
[58] Field of Search .................... 181/113, 119, 121; 277/53, 29, DIG. 8, 70; 91/216 B; 92/110, 111, 117 A

[56] References Cited

U.S. PATENT DOCUMENTS

| 3,159,233 | 12/1964 | Clynch et al. | 181/119 |
| 3,745,885 | 7/1973 | Fair et al. | 181/119 |
| 4,031,716 | 6/1977 | Zabcik | 277/53 |

Primary Examiner—S. C. Buczinski
Attorney, Agent, or Firm—William J. Miller

[57] ABSTRACT

A high pressure seal is formed between a stationary piston and a reciprocating cylinder. The seal includes a sleeve which has an inner diameter dimensioned to permit the cylinder to slide freely over the piston rod, the sleeve being in rigid contact at one end to the cylinder and the other end to an end plate surrounding the piston and closing the end of the sleeve. A bleeder port communicates with the outer surface of the piston rod, through the piston rod, and terminates at a low pressure supply. Bleeder grooves are formed around the inner wall of the sleeve. A first bleeder groove is positioned in the inner wall of the sleeve at the mid-stroke position of the piston with second and third bleeder grooves positioned at each extreme position of the piston stroke in the inner wall of the sleeve. A plurality of pressure drop grooves is formed along the inner sleeve diameter such that the hydraulic fluid passing from the cylinder into the sleeve will gradually drop in pressure as it moves toward the end plate. Pressure relief at the end plate seal is provided by the hydraulic fluid accumulating in the bleeder grooves where it is removed through the bleeder port.

4 Claims, 2 Drawing Figures

HIGH PRESSURE SEALING APPARATUS

BACKGROUND OF THE INVENTION

The present invention relates to a high pressure seal between the piston rod and cylinder wall of a seismic transducer. While the invention is particularly useful in a transducer, it has application wherever a cylinder is adapted to move along a stationary piston.

DESCRIPTION OF THE PRIOR ART

High pressure seals for stationary pistons and moving cylinders have been provided in the past with an end plate to seal the space between the sleeve and the piston rod. In addition a plurality of pressure reducing grooves was provided, spaced along the inner wall of the sleeve. The bleeder ports, however, were always attached to the cylinder so that communication was provided at a location near the terminus of the cylinder near to the end plate. The above arrangement, however, necessitated a pipe being attached to a moving element. Such a configuration resulted in several problems, the first being failure of the pipe which connected the bleeder pipe to the low pressure sump and the second being the inability to effectively seal the moving cylinder from the external environment resulting in damage to the hydraulic mechanism from dirt, humidity, etc.

SUMMARY OF THE INVENTION

The present invention relates to a means for sealing the piston and cylinder in a seismic transducer. The seal provides an effective means for dropping the pressure as it nears the end plate, thereby providing a simple low pressure seal arrangement between the piston and the sleeve at the end plate. In order to prevent the pressure from building up and thus causing the low pressure seal to fail, a port was formed through the stationary piston rod having an inlet communicating with the space between the outside surface of the piston rod and inside surface of the sleeve. At approximately the midpoint in the stroke of the piston, a bleeder groove is formed having a width substantially identical to the diameter of the port, thus providing a low resistance outlet for hydraulic fluids which are passing from the hydraulic cylinder toward the end plate. Additional bleeder grooves are provided at the maximum stroke position on either side of the center position for the same purpose. The bleeder port outlet is connected to a low pressure sump.

The above arrangement provides an effective means for continually bleeding off the hydraulic fluid as it passes from the cylinder to the end plate, thereby preventing excessive pressure from building up at the low pressure seal. It also permits total enclosure of the hydraulic system, since no external pipes are connected to the moving cylinder or sleeve, while providing adequate lubrication and cooling to the seals and bearings.

RELATED APPLICATION

This application is related to an application Ser. No. 848,224 entitled "Seismic Transducer Construction" by Delbert W. Fair filed Nov. 3, 1977, which is concurrent with this application.

DETAILED DESCRIPTION OF THE PREFERRED EMBODIMENT

Figure 1:
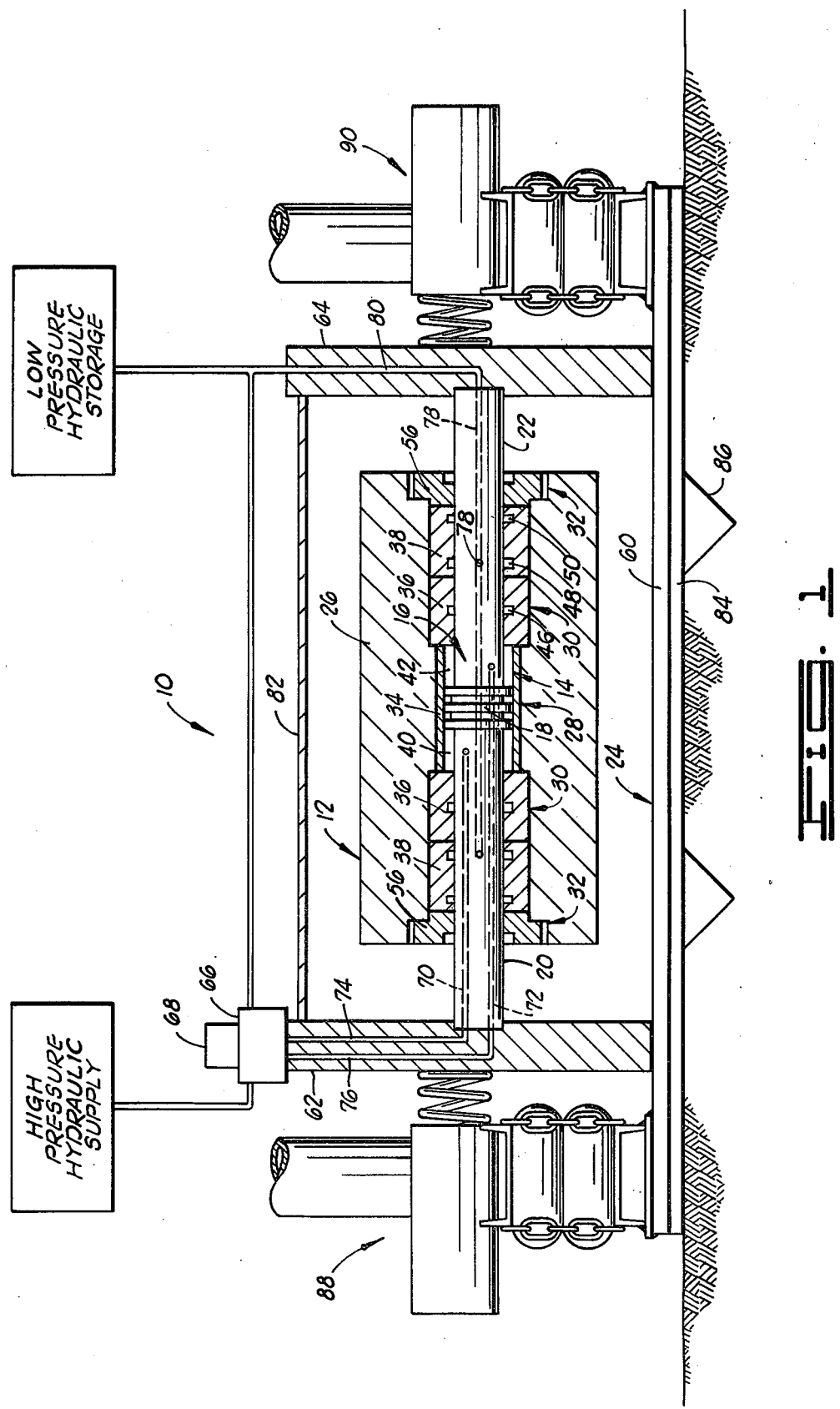
FIG. 1 is a side elevational view of a seismic transducer for generating seismic shear waves and which incorporates the subject matter of this invention.
Figure 2:
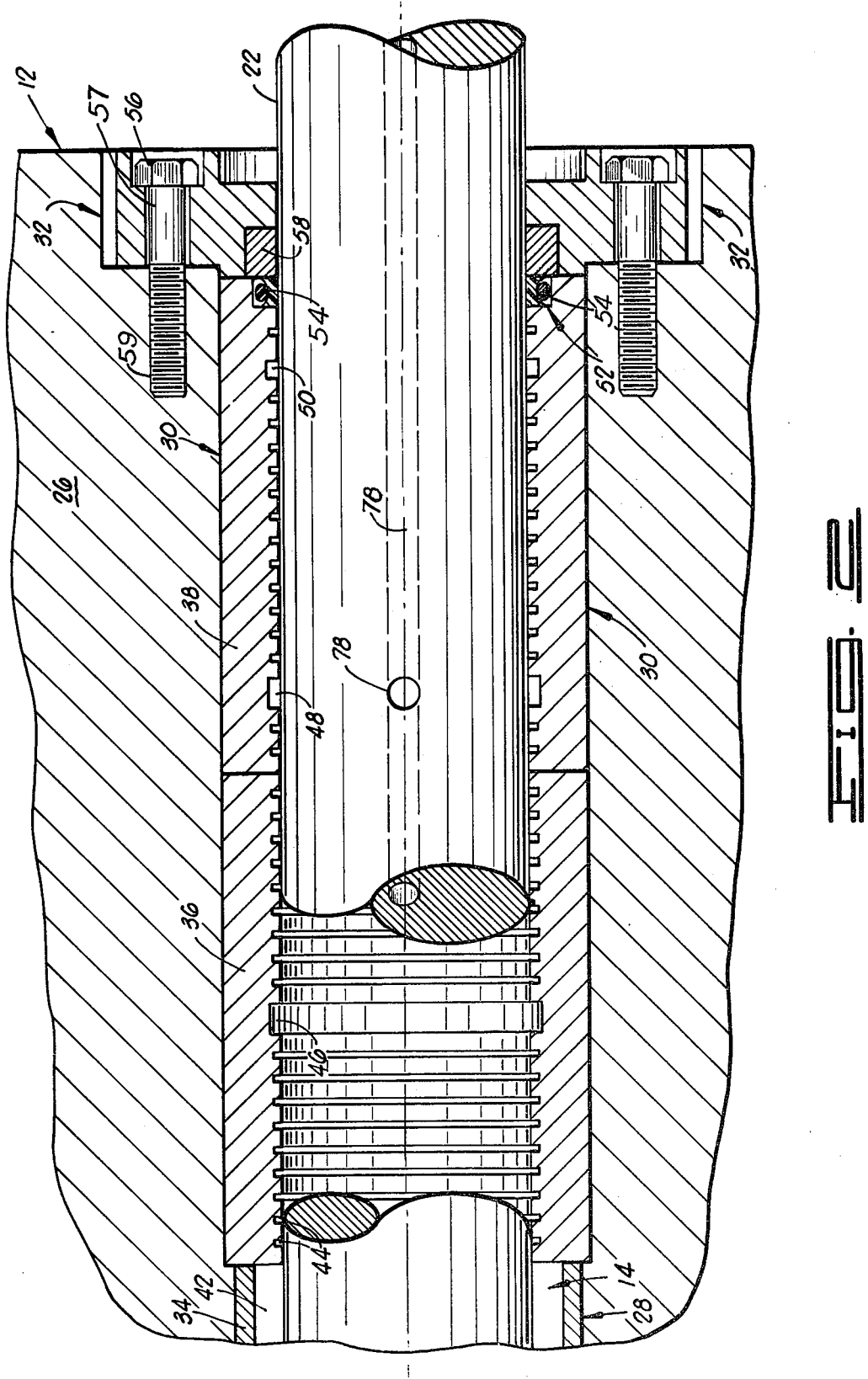
FIG. 2 is a partial cross-sectional view of a portion of FIG. 1 illustrating in detail the high pressure sealing apparatus of this invention.

Referring now to the drawings and in particular to FIGS. 1 and 2, a transducer incorporating the high pressure seal, which is the subject matter of this invention, is indicated generally by the reference number 10. The transducer 10 is comprised of a reaction mass member, indicated generally by the reference numeral 12. A pair of cylinder bores, each indicated generally by the reference numeral 14, extend through the reaction mass member and a piston member, indicated generally by the reference numeral 16, is reciprocally disposed within each such cylinder bore 14. Each piston member 16 is comprised of a piston 18 and opposite extending rods 20 and 22. A frame, indicated generally by the reference numeral 24, interconnects the ends of the rods 20 and 22 which protrude from the cylinder bores 14.

More specifically, the reaction mass member 12 is comprised of a mass block 26 fabricated of a suitable material such as steel and having a desired cross-section, e.g., rectangular. The block 26 has one or more cylindrical bores 28 extending longitudinally therethrough with a first counterbore 30 and a second counterbore 32 in each end of each of the bores 28. A tubular cylinder sleeve 34 is disposed in each of the bores 28 and extends from the bottom of one counterbore 30 to the bottom of the other counterbore 30. The interior wall of each of the tubular cylinder sleeves 34 forms one of the cylinder bores 14 in which one of the pistons 18 is reciprocally disposed, and an inner bronze bearing insert 36 and an outer bronze bearing insert 38 are disposed within each of the one or more counterbores 30 to slidingly receive the piston rods 20 and 22, and also to form the ends of the hydraulic cylinders and thereby form fluid chambers 40 and 42 on either side of each of the pistons 18. As is best shown in FIG. 2, the internal diameters of the bearing inserts 36 and 38 are provided with a plurality of small annular oil grooves 44, which reduce the flow of hydraulic fluid from the high pressure in the cylinders to the low pressure returns. Additionally, each of the inner bearing inserts 36 has a relatively large inner fluid collecting groove 46, and each of the outer bearing inserts 38 has relatively large center and outer fluid collecting grooves 48 and 50 disposed within its internal diameter. The manner of operation and the significance of these fluid collecting grooves are explained hereinafter. Disposed within the internal diameter adjacent the outer face of each of the outer bearing inserts 38 is a groove 52 in which is disposed conventional resilient seal means 54.

A cylinder end cap 56 is disposed within each of the one or more counterbores 32, around each of the piston rods 20 and 22, behind each of the outer bearing inserts 38. Each of the end caps 56 has disposed within its inner face an end cap bearing 58 (FIG. 2). Each of the end caps 56 is held in place by a plurality of suitable high torque bolts 57 extending through the end cap into appropriately threaded bores 59 in the block 26.

A hydraulic fluid bleed-back port 78 is disposed within each remaining end of the piston members 16. Each of the ports 78 communicates with the outer peripheral surfaces of the rod 20 and the rod 22 adjacent the bearing inserts 36 and 38. Each of the ports 78 also communicates with a return port 80 in the end plate 64 that is further connected to the low pressure hydraulic storage. The location of the openings of the bleed-back ports 78 in relation to the fluid collecting grooves 46, 48 and 50 is important.

OPERATION

As is best shown in FIGS. 1 and 2, when the mass member 12 is centered between the end plates 62 and 64, the openings of the bleed-back ports 78 are adjacent the center fluid collecting grooves 48. FIG. 2 shows the mass member 12 in this centered position. This will normally be the stable position of the mass member when the transducer is not being driven by an external signal. As long as there is fluid under pressure in the chambers 40 and 42 there will be a small flow of fluid between the rods and bearing inserts. This fluid will be collected in the grooves 48 and returned to the low pressure side of the hydraulic system via the ports 78. The inner and outer fluid collecting grooves 46 and 50 are located so that when the mass member 12 is at the maximum extent of its travel in either direction the bleed-back ports 78 will be adjacent one of the fluid collecting grooves 46 and 50. In this manner, if the mass member 12 is located at a central position relative to the maximum extent of its reciprocating excursions, or if it is located or becomes lodged at either of the maximum extents of its reciprocating excursions, the fluid will be collected in one of the fluid collecting grooves and returned to the hydraulic system via the ports 78. During normal operation the fluid will collect in the grooves 46, 48 and 50 and as the ports 78 periodically communicate with those grooves the fluid will be returned to the low pressure side of the hydraulic system.

It can be seen from the above that an effective method of sealing a high pressure piston and cylinder system has been described, particularly with respect to a seismic transducer. It is obvious, of course, that the arrangement can be used to seal any system so long as the piston is stationary and the cylinder is moveable, whether it is a seismic transducer or some other unit, and the invention is not so limited as to apply solely to a seismic transducer. The particular number of pressure dropping grooves is determined by the differential in pressure between the cylinder and the end plate seal as well as the length of the sleeve or sleeves necessary to accomplish the reduction in pressure. While several bleeder grooves are illustrated in this invention, it is obvious that, if the stroke is so short that the bleeder port is in contact during the stroke of the piston with the bleeder groove at all times, then no additional bleeder grooves need be required.

It is obvious that numerous changes in the construction and arrangement of parts can be made by those skilled in the art, which changes are encompassed within the spirit and scope of this invention as defined by the appended claims.

What I claim is:

1. A high pressure seal for a stationary piston with respect to the cylinder with an axially attached rod with a reciprocating cylinder comprising:

a sleeve means having an inner diameter dimensioned to freely slide over said piston rod, said sleeve being in rigid contact at one end with said cylinder and having a seal attached to its remaining end and sealably surrounding said piston rod;

bleeder-port means communicating with the outer surface of said piston rod and through said piston rod parallel to its axis and terminating at a low pressure supply;

bleeder-groove means formed both in the inner wall of said sleeve at substantially the mid-travel point of said sleeve where said cylinder is reciprocated and at each of the extreme travel points of said sleeve; and a plurality of circumferential pressure reducing grooves formed in the inner wall of said sleeve and spaced along said sleeve between said cylinder and seal whereby as the hydraulic fluid under pressure moves from the cylinder toward said seal the bleeder grooves will provide a reservoir where the hydraulic fluid can be removed from the system, thereby maintaining a low pressure on said sleeve.

2. A transducer for inducing waves in an elastic medium such as the earth including a hydraulic fluid system having a high pressure side and a low pressure side, said transducer comprising:

a reaction mass member having a plurality of cylinder bores extending therethrough;

a piston member having a piston and oppositely extending piston rods reciprocally disposed in each of said cylinder bores;

means disposed within each of said piston members for introducing fluid under pressure from said high pressure side into cylinder bores alternately on opposite sides of each of said pistons for reciprocating said piston members relative to said mass member;

fluid bleed-back means disposed within the piston member for continuously returning the fluid which flows between said cylinder bore and the piston rods to said low pressure side of said hydraulic fluid system; and a frame interconnecting the ends of the oppositely extending piston rods, said frame having a surface thereon for engaging a surface of the elastic medium.

3. The transducer of claim 2 which further comprises:

a bearing insert disposed within each end of the cylinder bore to slidingly receive one of the piston rods, each of said bearing inserts having disposed within its inner diameter, a fluid collecting groove to collect that fluid which flows between the cylinder bore and the piston rods and wherein said bleed-back means is further characterized as including a fluid bleed-back port disposed within the piston member, communicating the outer diameter of each of the rods, adjacent the fluid collecting grooves of the bearing inserts, with the return port of the first end plate.

4. The transducer of claim 3 wherein:

the piston members are further characterized as having fluid bleed-back ports disposed therein communicating the outer diameter of the piston rods adjacent the bearing inserts with a low pressure hydraulic supply so that lubricating fluid, which flows from the cylinder bores through the clearance between the rods and the bearing inserts, is returned to the hydraulic fluid system; and wherein the bearing inserts have disposed within their inner diameters at least three fluid collecting grooves, the grooves being so located that when the mass member is located at a central position relative to the maximum extent of its reciprocating excursions, or when the mass member is located at either of the maximum extents of its reciprocating excursions, the bleed-back ports are in fluid communication with one of the fluid collecting grooves in each bearing insert.

* * * * *